United States Patent
Stevens

(10) Patent No.: US 7,860,743 B2
(45) Date of Patent: Dec. 28, 2010

(54) METHOD AND SYSTEM OF DISTRIBUTING ADVERTISEMENTS

(75) Inventor: Clarke Stevens, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 778 days.

(21) Appl. No.: 11/209,889

(22) Filed: Aug. 23, 2005

(65) Prior Publication Data

US 2007/0050244 A1    Mar. 1, 2007

(51) Int. Cl.
*G06Q 30/00*    (2006.01)

(52) U.S. Cl. .............................. 705/14; 705/26; 725/23; 725/32; 725/34; 725/35; 725/36; 725/135; 725/139; 725/142; 709/203; 235/379; 370/352; 370/390; 370/468; 375/240.03; 375/240.26; 379/88.13; 386/52; 386/109; 386/68

(58) Field of Classification Search ................ 705/1–28
See application file for complete search history.

(56) References Cited

U.S. PATENT DOCUMENTS

| | | | |
|---|---|---|---|
| 6,772,209 B1 * | 8/2004 | Chernock et al. | 709/225 |
| 7,216,090 B2 * | 5/2007 | LaCroix | 705/14 |
| 2002/0152318 A1 * | 10/2002 | Menon et al. | 709/231 |
| 2003/0074256 A1 * | 4/2003 | LaCroix | 705/14 |
| 2004/0172336 A1 * | 9/2004 | Forsell et al. | 705/26 |
| 2005/0125831 A1 * | 6/2005 | Blanchard | 725/81 |
| 2006/0029093 A1 * | 2/2006 | Van Rossum | 370/432 |
| 2006/0117046 A1 * | 6/2006 | Robertson et al. | 707/101 |
| 2007/0233571 A1 * | 10/2007 | Eldering et al. | 705/14 |

FOREIGN PATENT DOCUMENTS

WO    WO 2008/073358 A2 *    6/2008

OTHER PUBLICATIONS

"NDS' Personal TV to be Enabled by STMicroelectronics Chipsets", Business Wire, Apr. 12, 2000.*

* cited by examiner

*Primary Examiner*—John Van Bramer
*Assistant Examiner*—William A Brandenburg
(74) *Attorney, Agent, or Firm*—Brooks Kushman P.C.

(57) ABSTRACT

Method and system of distributing advertisements for storage in a network. The stored advertisements being retrievable for insertion within or other association with services provided to a network subscriber. Identifying characteristics of the advertisement may be used to facilitate the storage thereof and identifying characteristics of the customs may be used to facilitate advertisements associated with services accessed thereby.

5 Claims, 1 Drawing Sheet

METHOD AND SYSTEM OF DISTRIBUTING ADVERTISEMENTS

BACKGROUND OF THE INVENTION

1. Field of the Invention

The present invention relates to methods and systems of distributing advertisements for storage in a network wherein the stored advertisements may be subsequently retrieved for insertion within or other association with services provided to a network subscriber.

2. Background Art

Cable, satellite, data, and other networks are typically provided and supported by a network provider. One means for the service provider to generate revenue is to charge advertiser for advertisements distributed through the provider's network. Typically, the advertisements are associated with customer services accessed through the provider's network and the advertisers are charged as a function thereof. The network providers are faced with the problem of storing the advertisements for subsequent association with the services.

SUMMARY OF THE INVENTION

One non-limiting aspect of the present invention relates to a method of distributing advertisements in a media system having a number of media devices. The method may include determining a number of advertisements to be associated with media services provided through the system, determining one or more identifying characteristics for the advertisements, and allocating the advertisements for storage on the media devices as a function of the identifying characteristics associated therewith.

Another non-limiting aspect of the present invention relates to a method of associating advertisements with services provided by a cable system operator. The method may include determining a number of advertisements to be associated with services provided through the cable system, determining one or more identifying characteristics for the advertisements, storing the advertisements in the system as a function of the identifying characteristics associated therewith, and retrieving the stored advertisements for association with services provided by the cable system operator.

Another non-limiting aspect of the present invention relates to a system of distributing advertisements. The system may include a number of media devices in electronic communication for providing services to a number of customers, and an advertisement tool configured to allocate advertisements to the number of media devices as a function of one or more identifying characteristics associated with the advertisements.

Another non-limiting aspect of the present invention relates to a method of managing advertisements in a media system having a number of media devices. The method may include determining a number of advertisements to be associated with media services provided through the system, distributing the advertisements for storage on the media devices, and purging one or more of the distributed advertisements from the storage devices associated therewith.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description and the accompany drawings in which:

DETAILED DESCRIPTION OF THE PREFERRED EMBODIMENT(S)

Figure 1:
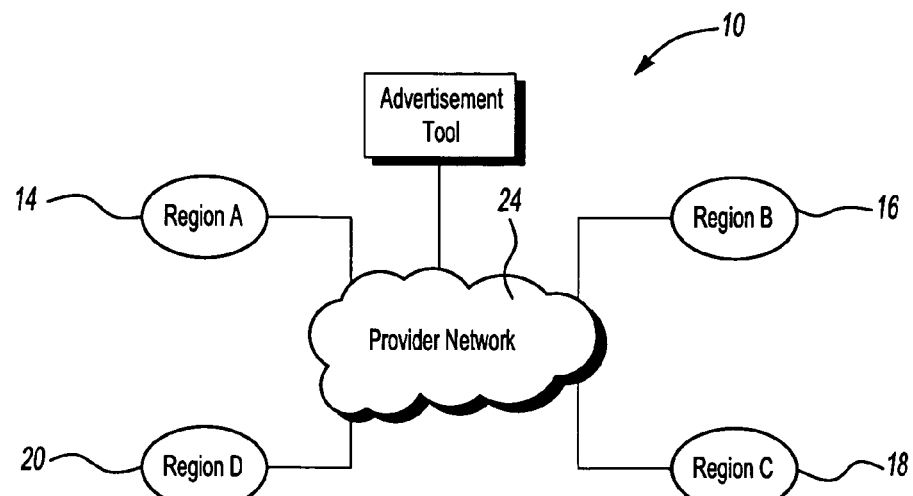
FIG. 1 illustrates a system in accordance with one non-limiting aspect of the present invention.

FIG. 1 illustrates a system 10 in accordance with one non-limiting aspect of the present invention. The system 10 may relate to any number of environments where electronic services associated with a provider are delivered to a number of subscribers (customers) located in a number of different regions 14-20. A provider network 24 may be configured to distribute signals associated with the services to the various subscriber regions 14-20.

Each subscriber region 14-20 may include any number of customer premises features and devices (not shown) to support customer access to the services. For example, if the provider is cable services provider, each region 14-20 may include settop boxes, cable modems, computers, gateways, and other features to facilitate customer access to voice, data, and television services offered by the provider.

A number of devices also may be included to support signal transmission within the system 10. The devices may be associated with any number of features used to transport signals associated with the subscriber services. The devices may be configured to support terrestrial and extraterrestrial components and infrastructures, and to communicate signals over cable lines, telephone lines, and/or satellite or other wireless and wireline architectures. The devices may cooperate to define virtual and non-virtual, private and/or public networks, such as the Internet and provider specific private networks.

With respect to the exemplary cable environment, the provider may be associated with a system (headend) or other feature of a cable service provider to facilitate signal communications between the regions. It may include a memory (not shown), user interface (not shown), and other features to control, program, and execute the operation thereof. The devices and features used to facilitate delivery of the subscribers services may be associated with any number of electronic devices which receive, communicate, or perform signal manipulations.

For example, a portion of the devices may be associated with, a router, hub, switch, gateway, conditional access router (CARs), cable modem terminations system (CMTSs), network provisioning unit (NPUs), session boarder controller, media gateway, media gateway controller, signaling gateway, call management server, presence server, SIP routing proxy, SIP proxy/registrar server, PCMM policy server, bandwidth on demand server, streaming server caching proxy, gaming server, CDN, media acquisition server, provider server, a unified messaging server, SIP feature server, OSS/BSS, global directory server, digital or personal video recorder (DVRs, PVRs), media terminal adapter (MTA), and/or outlet digital adapter (ODA).

One or more of the devices may include or be configured to include a memory (not shown) for storing electronic data. The memory may be of a relatively small size to store less data and/or of a relatively large size to store more data. Data may be transmitted from the provider and other devices for storage on the memories. The stored data may be subsequently retrieved for usage by other devices and features associated with the system.

The devices may be configured to support storing and transmitting the data. For example, some of the devices may be existing features used by a cable operator to support existing cable services. These devices may be configured or re-programmed to facilitate storing and transmitting the data. Likewise, some of the devices may be new devices that may be configured prior to or in association with being deployed in the system 10. Of course, the present invention contemplates any number of methods and features to facilitate configuring the devices to store and transmit data, regardless of when the devices have been deployed for use in the system.

The provider and devices may be configured to operate according to or support the operation of any number of protocols, applications, and procedures, including applications such as, but not limited to, linear and non-linear television programming (cable, satellite, broadcast, etc.), Video on Demand (VOD), interactive television (iTV), interactive gaming, pay-per-view (PPV), and protocols such as Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

The foregoing system 10 may be used to facilitate a peer-to-peer (P2P) application where data is transferred from one location to another through so-called swarming applications. These applications may be characterized by a complex distributed caching and delivery architecture. The files may be parsed into a large number of chunks, or sub-files, and stored on various memories. A "blue print" may be provided by the controller or other feature in the system for assembling the pieces of data into a coherent, usable file.

As described below in more detail, the system 10 may include an advertisement tool 28. The advertisement tool 28 may be a logically operating unit, such as a computer or server, having resources for communicating signals to the devices located within the various regions 14-20 and/or the devices associated with supporting the network 24. The advertisement tool 18 may be configured to execute any number operations and to implement any number of programs or otherwise control operation of the devices in the system 10. The advertisement tool 28 may be associated with the provider and/or a vendor otherwise associated with the system 10.

Figure 2:
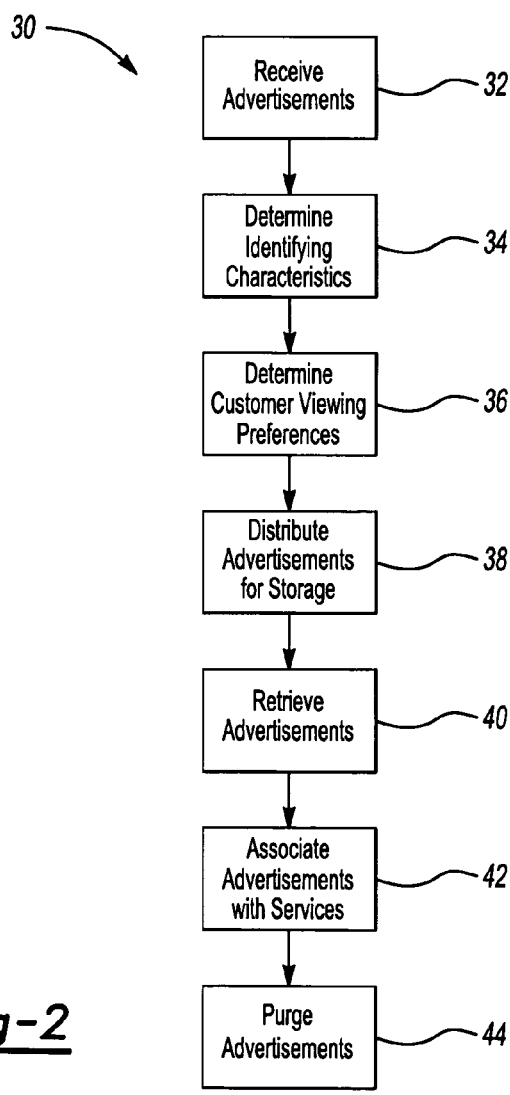
FIG. 2 illustrates a flowchart of a method of distributing advertisements in accordance with one non-limiting aspect of the present invention.

FIG. 2 illustrates a flowchart 30 of a method of distributing advertisements in accordance with one non-limiting aspect of the present invention. As described below in more detail, advertisements and/or pieces of advertisements may be distributed as data to one or more of the devices for storage and subsequent retrieval. The distributed advertisements may be retrieved for association with services provided through the system. The advertisement tool 28 may be configured to direct operations associated with implementing one or more of the features associated with the flowchart 30 and the methods of the present invention.

Block 32 relates to receiving or otherwise locating advertisements for distribution in the system 10. The advertisements may be received by the provider from a vendor or other entity associated with the production thereof. For example, the vendors may be instructed to include the advertisements in a file download or other electronic transfer. Of course, any number of other methods may be used to receive the advertisements, including the provider locating previously received advertisement stored on a local database, on one or more the devices, or other storage features associated with the system 10.

Block 34 relates to determining identifying characteristics for the advertisements. The identifying characteristics may relate to various descriptive features associated with ascertaining the content and/or intended audience of the advertisement. For example, the content may be identified as a function of a title or genre, a short textual description, closed captioned text, and other information included with or assigned to the advertisement. The intended audience may be identified by a viewing rating (adult, child, R, PG-13, etc.), a demographic value (male, female, professional, etc.), a geographic locator (city, state, country, etc.), and the like.

The identifying characteristics may be determined by the vendors and/or the provider. The vendors may be required to associate identifying information with each advertisement prior to providing the advertisements to the provider. In addition, the provider may include operators or other individuals who may view or otherwise analyze the advertisements and assign the characteristics thereto.

The identifying characteristics may be stored by the provider and/or associated with metadata. The provider may include a database for listing the identifying characteristics as a function of an unique identifier associated with each advertisement. The database may be consulted by a device processing the advertisement to determine the identifying characteristics associated therewith. Alternatively, the metadata file may travel with the advertisement. The metadata file may be read by a device processing the advertisement to determine the identifying characteristics associated therewith.

Block 36 relates to determining viewing preferences for one or more of the subscribers. The viewing preferences may be associated with content and other information related to programs, movies, and other data watched or otherwise accessed by the subscribers. A database or other repository associated with the provider may be responsible for storing the customer viewing preferences. The relevancy of the viewing preferences may be assessed based on input from the subscribers and/or the frequency by which certain subject matter is accessed.

Optionally, the viewing preferences may be established by the subscribers themselves. A graphically user interface (GUI) or other feature may be provided to the subscribers for inputting desired viewing patterns. The subscribers may access the GUI through a STB menu, VOD platform, webpage, or other portal associated with the provider. Various viewing preference options may be provided for selection by the user. For example, the GUI may be used to create a preferences file where the user is able to select a number of viewing preferences, such as preferences for viewing a particular genre, actor, content, rating, etc.

Block 38 relates to distributing the advertisements for storage on the devices. An algorithm or other feature may be used to assess the most efficient storage locations for the advertisements. For example, a particular geographic area or region may be associated with an advertisement for a local merchant. The merchant's advertisement may be distributed for storage in a geographic location associated with the merchant, as it is likely that mainly the subscriber within close proximity of the merchant will desire viewing of the advertisement.

Optionally, the advertisements may be stored as a function of network topology information. For example, the network topology (system topology) information may indicate nodes on or in association with the network 24 having memory available for storing the advertisements. The network topology information may be used to indicate portions of the network suitable for communicating with the intended audience of the advertisement. In more detail, portions of the network 24 may be unable, in some cases, to communicate with other portions of the network such that advertisement may allocated to insure the intended audience of each is within the communication capabilities of the portion of the network associated with the storage thereof.

The advertisements may be distributed for storage on an individual basis as function of one or more intended recipients. Particular advertisement may be stored on devices associated with the one or more intended recipients. Likewise, the advertisements may be distributed for storage on an aggregate basis. This may include distributing advertisements to locations associated with a greater number of intended recipients.

The advertisements may be stored on the devices as logical entities and/or individual pieces of data. The logical entities may generally be characterized as storage of the entire advertisement on a single storage device. The advertisements may also be segmented into individual pieces of data such that portions of the advertisement are located on different storage devices. An indexing file of other feature may be created for tracking the stored advertisements and facilitating the retrieval thereof, such as through a swarming operation.

Block 40 relates to retrieving the stored advertisements. This may include providing instructions to transport the advertisements from the storage devices to the customer device accessing the services. The customer device may be configured to insert the advertisements into a media stream or other feature being accessed by the customer. In some case, multiple pieces of the advertisement may be transported from multiple storage devices and assembled by the customer device in order to associated the complete advertisement with the provide services, such as if the advertisement is segmented and stored as individual pieces of data.

Individual advertisement pieces may be swarmed to the desired customer device in a swarming operation. The swarmed data pieces may then be reconstructed by the customer device to complete the advertisement. This may include the provider and/or the customer device instructing the storage devices to communicate the data segments to the customer device. Optionally, the data may be swarmed in the most efficient manner to the customer devices, such as over the lowest cost communication medium, shortest transport path, etc.

Block 42 relates to associating the retrieved advertisements with services provided to the customers. The association may be provided by the customer device including the advertisement with services accessed by the customer associated therewith, such as according to instructions included with the advertisement and/or instructions provided from the advertisement tool 28. The advertisement may be included within television programs, video on demand or other pay-per-view services, data access and transport, audio playback and download, and other services associated with the provider.

Block 44 relates to purging one or more of the distributed advertisements from the system, and optionally, storing the purged advertisements on a database or other memory associated with the advertisement tool. The purging generally relates to deleting expired advertisement from their storage locations on the devices. This may include deleting one or more pieces of individual advertisements from multiple storage devices. Optionally, the indexing file may be used to facilitate the data purging. The deleted files may be permanently deleted and/or stored in the database for subsequent use.

The advertisement tool 28 may be configured with a schedule or otherwise instructed to emit data deletion signals to the relevant storage devices. The signals may be emitted as a function of predefined deletion intervals or in response to other triggering events. For example, the advertisement may be associated with a purchased showing interval upon the expiration of which the associated advertisements are purged. Optionally, the pieces of data stored on the storage devices may include self-executing files or metadata for instruction the deletion thereof. Such an arrangement may be used in place of and/or to supplemental the purging signals emitted from the advertisement tool.

Optionally, the above-described swarming technology may be used dramatically increases the distribution efficiency of the advertisements by breaking large files into small pieces and co-opting a network of devices and their storage to act as servers for distributing the pieces of the advertisements. This may be used to generate a more uniform usage of network distribution paths. This method of distribution is particularly suited to the delivery of content to any size of group on demand.

The method of the present invention may be applied to the specific problem of on-demand distribution of digital content on a managed network with DVR's acting as the swarming nodes. This may include a user interface that allows the user to select a portion of the disk space on their DVR to be used as a swarming node under management of the service provider. This may also include management software resident on a server in the network that distributes content and files to the swarming nodes based on geography, demographics, popularity, or other criteria. The management system may be used to collect information on the usage of content and the disk space offered to the network by individual users, such as to be used in managing the distribution of the content and potentially award benefits to the users based on the amount of storage space they offer to the network.

The present invention allows a service provider to optimally manage the distribution of ad content or other stored content by sub-swarms of nodes to serve the ads based on geography, demographics, the popularity of the ads or other criteria. It also provides the means for users to offer an amount of disk space to the network for this purpose in exchange for consideration from the service provider. The service provider benefits from consumers offering storage space to the swarming distribution network and from usage data generated by users. The service provider can also use the system to deliver software and other files. The advertisers benefit from the ability to deliver ads to very targeted sub-segments of television viewers. The users benefit by receiving ads more suited to their interests as well as possible consideration from the network provider for participating in the swarming network.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of managing advertisements in a media system used to provide services to a number of subscriber media devices, the subscriber media devices being stationed at subscriber locations to facilitate access to the services, the method comprising:

requesting a subscriber associated with each media device to identify an amount of memory to be made available on the associated media device for storing advertisements;

distributing portions of a number of advertisements for storage on the media devices according to the identified amount of available memory, wherein each portion contains a fraction of an entire advertisement and must be combined with the other portions in order to show the entire advertisement;

distributing the portions such that at least two portions of the entire advertisement is stored on at least two different media devices; and purging one or more of the portions of the entire advertisement from the media devices in response to the subscriber requesting a reduction in the amount of memory to be made available for storing advertisements including issuing purging instructions to each of the media devices storing portions of the entire advertisements.

2. The method of claim 1 further comprising transmitting purging signals to the media devices for instructing deletion of the advertisements.

3. The method of claim 1 further comprising including data with one or more of the advertisements for directing the purging thereof.

4. The method of claim 1 further comprising instigating purging of the one or more portions of the advertisements according to a predefined schedule.

5. The method of claim 1 further comprising, prior to distributing the at least two portions of each advertisement, embedding information within a first one of the at least two portions to facilitate retrieving at least a second of one of the at least two portions, the information identifying media devices for storing each portion of each advertisement prior to each portion actually being stored at the media devices.

* * * * *